US008797346B2

(12) United States Patent
Park et al.

(10) Patent No.: US 8,797,346 B2
(45) Date of Patent: Aug. 5, 2014

(54) GAMMA CORRECTION SYSTEM AND METHOD FOR DISPLAY DEVICE

(75) Inventors: Sung-Un Park, Yongin (KR); Ji-Yun Son, Yongin (KR); Dong-Ho Yoon, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 240 days.

(21) Appl. No.: 13/420,500

(22) Filed: Mar. 14, 2012

(65) Prior Publication Data

US 2013/0120659 A1    May 16, 2013

(30) Foreign Application Priority Data

Nov. 10, 2011  (KR) .................. 10-2011-0117079

(51) Int. Cl.
| G09G 5/00 | (2006.01) |
| G09G 5/02 | (2006.01) |
| G09G 3/30 | (2006.01) |
| H04N 17/00 | (2006.01) |
| H04N 5/202 | (2006.01) |
| H04N 5/14 | (2006.01) |
| H04N 9/64 | (2006.01) |
| H04N 9/12 | (2006.01) |
| H04N 1/46 | (2006.01) |
| G03F 3/08 | (2006.01) |
| G06T 5/00 | (2006.01) |
| H04N 1/60 | (2006.01) |

(52) U.S. Cl.
CPC ...... *G09G 5/02* (2013.01); *G06T 5/001* (2013.01); *H04N 1/6058* (2013.01)
USPC ........... 345/590; 345/581; 345/600; 345/606; 345/690; 345/77; 348/180; 348/254; 348/671; 348/708; 348/739; 358/519; 358/525

(58) Field of Classification Search
USPC ........ 345/581, 589–590, 600, 606, 616, 690, 345/204, 48, 63, 77–78; 348/180, 223.1, 348/254, 630, 671, 687, 708, 739, 761; 358/504, 509, 516–519, 523–525, 358/447–448; 382/162, 167, 254, 274, 276
See application file for complete search history.

(56) References Cited

U.S. PATENT DOCUMENTS

| 8,228,270 B2 * | 7/2012 | Park et al. ................ 345/82 |
| 8,525,934 B2 * | 9/2013 | Okui et al. ............... 348/687 |
| 2007/0139310 A1 * | 6/2007 | Kang et al. ............... 345/76 |
| 2010/0289884 A1 * | 11/2010 | Kang .......................... 348/58 |
| 2011/0007102 A1 * | 1/2011 | Ogura et al. ............. 345/690 |

FOREIGN PATENT DOCUMENTS

| KR | 10-2003-0060462 A | 7/2003 |
| KR | 10-2006-0120766 A | 11/2006 |
| KR | 10-2008-0011883 A | 2/2008 |
| KR | 10-2009-0063533 A | 6/2009 |

* cited by examiner

*Primary Examiner* — Wesner Sajous
(74) *Attorney, Agent, or Firm* — Knobbe Martens Olson & Bear LLP

(57) ABSTRACT

A gamma correction system and method for a display device are disclosed. According to one aspect, the gamma correction system includes a display panel configured to display an image, a measuring unit configured to acquire optical characteristic information from the image displayed on the display panel, and a display panel driver configured to convert a gamma data result value obtained after performing optical compensation for at least two sample gray values among a plurality of reference luminance values into a corresponding data voltage and calculate a data voltage for the rest of the luminance values for which optical compensation is not performed.

13 Claims, 6 Drawing Sheets

FIG.4

| Gray level | Luminance | Gamma data | | | Converted data voltage value | | |
|---|---|---|---|---|---|---|---|
| | | Red | Green | Blue | Red | Green | Blue |
| V255 | 300 | 12F | 147 | 149 | 2.0965 | 1.9299 | 1.9160 |
| V191 | 158.87 | 43 | 42 | 42 | 2.3892 | 2.2652 | 2.2537 |
| V127 | 64.75 | 40 | 39 | 38 | 2.6689 | 2.5807 | 2.5842 |
| V63 | 13.86 | 30 | 2E | 30 | 2.8204 | 2.7635 | 2.7462 |
| V31 | 2.93 | 2C | 2B | 2A | 2.9860 | 2.9468 | 2.9412 |
| V15 | 0.61 | 61 | 5A | 5E | 3.1786 | 3.1932 | 3.1630 |
| V5 | 0.07 | 76 | 39 | 72 | 3.3054 | 3.6086 | 3.3123 |
| V0 | 0 | 2 | 2 | 2 | 4.2000 | 4.2000 | 4.2000 |

GAMMA CORRECTION SYSTEM AND METHOD FOR DISPLAY DEVICE

CROSS-REFERENCE TO RELATED APPLICATIONS

This application claims priority to and the benefit of Korean Patent Application No. 10-2011-0117079 filed in the Korean Intellectual Property Office on Nov. 10, 2011, the entire contents of which are incorporated herein by reference.

BACKGROUND

1. Field

The technical field relates to a gamma correction system and method for a display device, and more particularly, to a correction system and method for correcting luminance dispersion for each luminance adjustment step in a display device.

2. Description of the Related Technology

In order to ensure image quality of a display device to comply with technical specifications or warranties associated with a product, during a manufacturing process of the display device the display device is subject to adjustment processes for insuring luminance, accuracy of a color coordinate for reference luminance value, and dispersion or deviation of luminance which may occur in each pixel due to a low temperature poly-silicon (LTPS) process and a deposition process.

Generally, an example process for correcting dispersion or deviation of luminance in a display module of a display device includes a method of including a luminance table having several luminance adjustment steps, consecutively correcting optical characteristics such as luminance and a color coordinate based on a reference luminance adjustment step for each selected luminance value, and performing correction for other luminance adjustment steps by applying a correction equation based on the corrected optical characteristics.

That is, compensation is generally performed by obtaining a difference in gamma data which occurs as reference luminance value is corrected, e.g., luminance dispersion and applying the difference multiplied by a luminance ratio to other luminance adjustment steps.

Optical characteristics corresponding to the reference luminance value can be stably measured and thus a substantially accurate correction for the reference luminance value may be achieved. However, a variation in the optical characteristic may increase due to a change of the optical characteristics resulting from the LTPS processing of a material or dispersion of a material when applying the correction method to luminance adjustment steps other than the reference luminance value. The greater difference from the reference luminance value a luminance value has, the greater the variation in the optical characteristic increases.

Since in many cases, the reference luminance value is the maximum luminance value, particularly in the case where a luminance adjustment step value is low, a variation in the optical characteristic thereof is at a level which is difficult to predict, and thus efficiency of a process for correcting luminance dispersion may be greatly reduced. As a result, correction of dispersion or deviation of luminance using a minimum number of luminance adjustment steps cannot be performed.

Therefore, a method of compensating luminance deviation that can minimize the variation in the optical characteristic in the luminance adjustment steps other than the reference luminance value adjustment step in the display device and substantially correct the dispersion or deviation of luminance so as to produce a display device having uniform optical characteristics for each luminance and reliable image quality is desirable.

The above information disclosed in this Background section is only for enhancement of understanding of the background of the invention and therefore it may contain information that does not form the prior art that is already known to a person of ordinary skill in the art.

SUMMARY OF CERTAIN INVENTIVE ASPECTS

According to one embodiment, a gamma correction system for a display device is disclosed. The system includes a display panel configured to display an image, a measuring unit configured to acquire optical characteristic information from the video displayed on the display panel, and a display panel driver configured to convert a gamma data result value obtained after performing optical compensation for at least two sample gray values among a plurality of reference luminance values into a corresponding data voltage and calculate a data voltage for the rest of the luminance values for which optical compensation is not performed.

According to another embodiment, a gamma correction method for a display device for correcting an optical characteristic of image data provided to a display panel displaying an image is disclosed. The method includes selecting a plurality of reference luminance values, performing optical compensation for at least two sample gray values among the plurality of reference luminance values, acquiring a gamma data result value corresponding to a sample gray value after the optical compensation to convert the gamma data result value into a corresponding data voltage, calculating a data voltage for the rest of the luminance values for which the optical compensation is not performed by using the data voltage of the sample gray value, and performing gamma compensation of video data applied to the display panel by using the data voltage for the luminance.

According to another embodiment, a gamma correction method for a display device for correcting an optical characteristic of image data provided to a display panel displaying an image is disclosed. The method includes selecting a plurality of reference luminance values, performing optical compensation for at least two sample gray values among the plurality of reference luminance values, obtaining a gamma data compensation value for the rest of the luminance values by using the gamma data result value for the sample gray value calculated after the optical compensation and an offset value acquired from the optical compensation, acquiring the gamma data result value for the sample gray value and gamma data compensation values for the rest of the luminance values and then converting the gamma data compensation values into data voltage, and performing gamma compensation of image data applied to the display panel by using the data voltage.

BRIEF DESCRIPTION OF THE DRAWINGS

FIG. 4 is a table showing an example in which gamma data measured for each reference luminance value is converted into a data voltage value in a gamma value converter 23 of FIG. 1.

DETAILED DESCRIPTION OF CERTAIN INVENTIVE EMBODIMENTS

Figure 1:
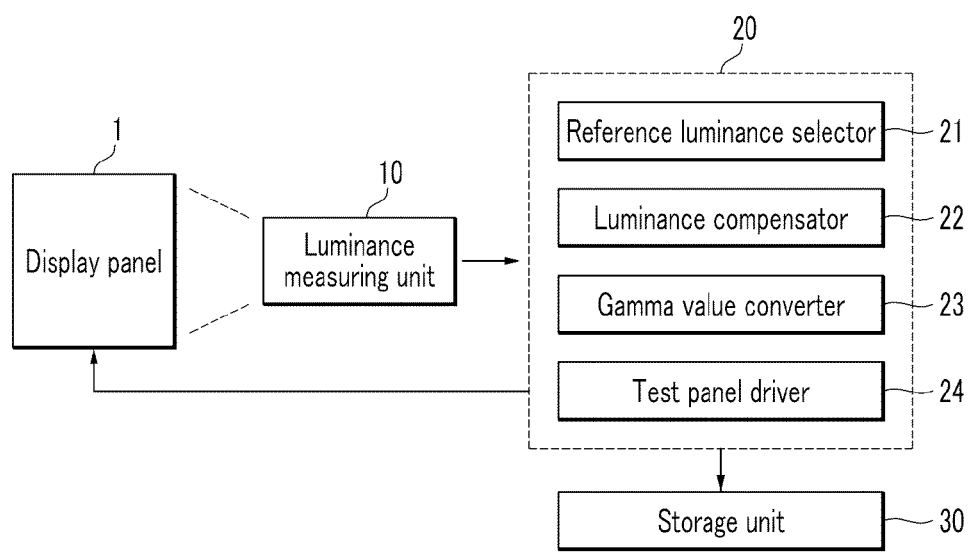
FIG. 1 is a block diagram showing the configuration of a gamma correction system for a display device according to some embodiments.

Some aspects of the invention will be described more fully hereinafter with reference to the accompanying drawings, in which some embodiments are shown The described embodiments may be modified in various different ways, all without departing from the spirit or scope of the invention In addition, in various embodiments, the same reference numerals are used in respect to the elements having the same construction and/or functionality and illustrated in the first embodiment, and in the other embodiments, only elements which are different from the first embodiment is illustrated.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

FIG. 1 is a block diagram showing the configuration of a gamma correction system for a display device according to some embodiments.

As shown in FIG. 1, a gamma correction system for a display device according to the some embodiments includes a display panel 1 configured to display an image, such as an image sequence of images, a luminance measuring unit 10 configured to acquire light emitted from the display panel to measure luminance, and a display panel driver 20 configured to drive the display panel so as to display an image according to corrected luminance.

The luminance measuring unit 10 measures luminance using light emitted when an image is displayed according to a test video signal in a display panel 1 and transfers luminance information to the display panel driver 20. However, optical characteristic information measured in the luminance measuring unit 10 is not limited to light emitting luminance of the video on the display panel 1 and may include optical characteristic information such as a color coordinate, and a gamma characteristic curve. The optical characteristic information on a test video of the display panel 1 is transferred from the luminance measuring unit 10 to the display panel driver 20 and thus used for optical correction of displaying an image.

The display panel driver 20 performs compensation so that the display panel 1 has an optical characteristic that is guaranteed under a product warranty or the like by using the optical characteristic information on the displayed video such as luminance and a color coordinate of the display panel 1. That is, the display panel driver 20 performs a process of compensating dispersion according to a material which occurs in a low temperature poly-silicon (LTPS) process, a deposition process, or the like for the display panels.

For this purpose, the display panel driver 20 includes a reference luminance value selector 21, a luminance compensator 22, a gamma value converter 23, and a test panel driver 24.

The reference luminance value selector 21 is configured to select a reference luminance value for light emission of a displayed video emitted from the display panel. The reference luminance value may be selected with reference to a luminance table, but a selection method that is not particularly limited.

A reference luminance value selecting method of the reference luminance value selector 21 may be pre-set using a program, and for example, the method may be classified by a unit of several tens of gray values among 256 gray values. The reference luminance value selection may be appropriately set depending on a product inspection process and particularly, may be divided into several gray value groups (luminance adjustment steps) since a measurement error may occur in low luminance and high luminance areas. For example, the reference luminance value selection may be divided into 8 luminance adjustment steps or more and a predetermined reference luminance value may be selected from among the luminance adjustment steps. In the gamma correction system according to the some embodiments, the highest luminance may be selected as a reference luminance value in each luminance adjustment step. When 256 gray values are divided into 8 luminance adjustment steps, gray values of V0, V5, V15, V31, V63, V127, V191, and V255, which are the maximum luminance of each of the luminance adjustment steps, may be selected as reference luminance value. At least two gray values among the reference luminance value may be selected as sample gray values to be applied to a compensation process.

The sample gray value in the some embodiments refers to luminance which is provided as a direct input value in a compensation process of optical characteristics such as luminance in order to correct dispersion of a display panel through the gamma correction system according to the some embodiments.

The reference luminance value information selected by the reference luminance value selector 21 is transferred to the luminance compensator 22. In this case, the display panel 1 is driven by a test video data signal according to the sample gray value selected from among the reference luminance value by using the test panel driver 24 connected to the luminance compensator 22 so as to display the test video. Then, the luminance measuring unit 10 acquires the optical information from the displayed video on the display panel. The luminance compensator 22 sequentially determines whether the acquired optical information is suitable for standard specification of optical characteristics such as luminance and a color coordinate of the display panel. In this case, when any one of the optical characteristics in the optical information is not suitable for the standard specification, the optical characteristic may be adjusted by using an offset value corresponding to a difference between a desired output luminance value and an actual output luminance value.

The adjustment using the offset value is not particularly limited, but the optical characteristic may be adjusted so as to comply with the standard specification by displaying the test video step by step while reducing or increasing the optical characteristic by the predetermined offset value, and acquiring the corresponding optical characteristic information again to determine a change in R/G/B gamma data values.

After performing a compensation process for the sample gray value of the reference luminance value in the aforementioned manner, the luminance compensator 22 performs luminance correction for the other luminance adjustment steps by using the actual gamma data value corresponding to a corresponding gray value after the compensation and the offset value.

The number of sample gray values of the reference luminance value which is a criterion when the luminance compensator 22 determines whether the optical characteristics such as the luminance and the color coordinate are suitable by displaying the test video on the display panel may be three or four for accuracy and may be at least two.

The compensation process performed by the luminance compensator 22 in the reference luminance value and other luminance adjustment steps will be described below in detail with reference to FIG. 3.

In the gamma correction system according to the some embodiments, the gamma value converter 23 substitutes an actual gamma data value obtained after compensating the reference luminance value acquired in the luminance compensator 22 with a data voltage value. That is, the gamma value converter 23 converts the gamma data value after compensation corresponding to the sample gray value of the reference luminance value into a corresponding data voltage value having an absolute value.

Since the gamma data value for each gray value of the reference luminance value has a relative characteristic, if the gamma data value is applied to other luminance adjustment steps, when the optical characteristic are changed due to a dispersion of the LTPS or a process material of a display panel product, as a difference from the reference luminance value is greater, a variation increases, which makes it difficult to ensure the accuracy of luminance compensation. Particularly, since there is a problem in that as the luminance adjustment step is low, a variation in the optical characteristic increases, the variation in the optical characteristic may be minimized even in the low luminance adjustment step by converting all gamma data values in hexadecimal number input to an IC of a completed display panel as a final product into data voltage which is an absolute value.

A data voltage conversion method in the gamma value converter 23 is not particularly limited, but may be determined by a particular specification in designing a gamma block for each IC in each display device product and an equation according to the specification may be determined as well. It is natural that the data voltage conversion of the gamma data value for the reference luminance value includes an initial conversion in the highest luminance adjustment step. In FIG. 4, an example in which gamma data measured for each reference luminance value is converted into a data voltage value in the gamma value converter 23 is shown in a table.

As shown in the table of FIG. 4, 8 gray value levels are selected from predetermined luminance adjustment steps as reference luminance value, a gamma data value is acquired by compensation, and a corresponding gamma result value is converted into data voltage, but the present invention is not necessarily limited thereto. That is, after luminance according to at least one gray value among luminance of 300 cd/m2 according to the maximum 255 gray value and the other reference luminance value is selected as an input value of the reference luminance value and a compensation process is performed to measure R/G/B gamma data values, the gamma data values may be changed to data voltage values depending thereon.

Thereafter, data voltage values for all the other gray values (V0-V255) including the other reference luminance value which is not applied to the compensation process may be obtained by using linear interpolation.

When data voltage for all luminance in conformity with standard specification of the display panel product is obtained and input to a data driver IC, a considerable change in the optical characteristic does not occur even in a low luminance adjustment step of video source data and, as a result, the optical characteristic can be substantially maintained.

The gamma correction system according to the some embodiments shown in FIG. 1 further includes a storage unit 30 connected to the display panel driver 20.

The storage unit 30 may receive and store the optical characteristic information according to the test video data signal acquired by the luminance measuring unit 10 through the display panel driver 20. Further, the storage unit 30 may store information acquired from each component included in the display panel driver 20. Specifically, the storage unit 30 may store information on division of luminance adjustment steps of total gray values divided by the reference luminance value selector 21 and information such as the selected reference luminance value and sample gray value. Further, when the display panel emits light in response to the predetermined sample gray value in the luminance compensator 22, an offset value adjusted in order to compensate the acquired optical characteristic to a standard specification level and a gamma data value after compensation corresponding to the acquired resultant sample gray value may be stored.

Further, the storage unit 30 may store data voltage values calculated for all the luminance adjustment steps including a data voltage value converted from the gamma data value for the reference luminance value in the gamma value converter 23.

The storage unit 30 may include an information table for the data voltage values for all gray values which are compensated by the gamma correction system.

Figure 2:
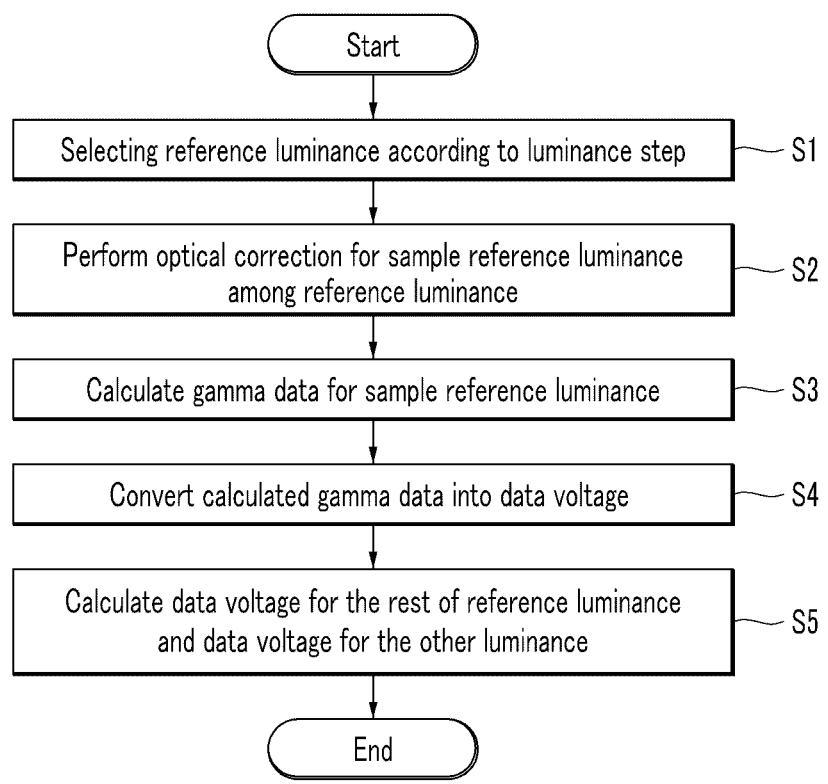
FIG. 2 is a flowchart showing a gamma correction method for a display device according to some embodiments.

FIG. 2 is a flowchart showing a gamma correction method for a display device according to some embodiments.

Since the components of the gamma correction system for a display device performing each adjustment step are described in detail in the embodiment of FIG. 1, a detailed description thereof is omitted.

First, the reference luminance value selector of the gamma correction system divides all gray values into a plurality of gray value groups, e.g., luminance adjustment steps and correspondingly selects a reference luminance value (S1). Each reference luminance value may be the maximum gray value of each luminance adjustment step.

Reference luminance value corresponding to a sample gray value among the reference luminance value is selected and an optical compensation process is performed by using the selected reference luminance value (S2). The optical compensation process refers to a deviation correction process of setting a gamma curve for maintaining stable display quality as a correlation between display luminance and gray value data. The correction of reference gamma voltage is repeatedly performed in order to remove a deviation between actual display luminance and display luminance according to gray value data. The optical compensation process is not particularly limited, but may be a multi time programming (MTP) process of repeatedly performing correction of the reference gamma voltage.

Therefore, in adjustment step S2, actual display luminance is measured by applying gray value data to the display panel according to the sample gray value among the reference luminance value and when a deviation from target luminance for corresponding sample gray value data occurs, reference gamma voltage is adjusted so that the actual display luminance becomes target luminance. The reference gamma voltage is voltage which is input to a driving circuit so as to generate gray value data determining display luminance as driving voltage or driving current and the adjusted reference gamma voltage is referred to as an offset value.

For example, when V255, V63, and V31 gray values are selected from among reference luminance value as sample gray values, the display panel is driven by receiving a sample data signal corresponding to each of the sample gray values. First, optical characteristic information is acquired from a sample display video displayed on the display panel by applying the sample data signal corresponding to the V255 gray value and it is determined whether the optical characteristic information corresponds to predetermined target values of luminance and a color coordinate. When the optical characteristic information does not correspond to any one of the target values, the sample data signal for the V255 gray value is compensated with the offset value to drive the display panel again. If the optical characteristic information acquired from the sample display video is within the specification range of luminance and a color coordinate corresponding to the V255 gray value by repeating a series of processes as described above, data compensation for other sample gray values of V63 and V31 is sequentially performed.

The gamma data result value corresponding to reference luminance value used as the sample gray value is calculated by repeatedly performing the MTP process in adjustment step S2 (S3). That is, when the optical characteristic information acquired from the sample display video enters the specification range of target luminance corresponding to the sample gray value by performing the MTP process, the MTP process is stopped and a gamma data result value corresponding to the sample gray value is extracted.

Then, the gamma data result value calculated in adjustment step S3 is converted into a data voltage value (S4). The conversion into the data voltage may be obtained by applying a predetermined equation determined according to a data driver IC gamma block specification for each result value for each R/G/B color of gamma data acquired to correspond to the reference luminance value of the sample gray value. A data voltage conversion equation varies according to a design specification for each driver IC and is irrelevant to the spirit of the present invention and thus omitted.

As an example of adjustment step S2, gamma data result values compensated to correspond to V255, V63, and V31 are obtained and then data voltage values corresponding to V255, V63, and V31 are calculated and acquired.

After the data voltage for each color for each sample gray value is obtained, data voltage for the other reference luminance value and data voltage for all the other luminance are calculated (S5). The process of calculating the data voltage for all the luminance in adjustment step S5 is not particularly limited, but the data voltage may be calculated through result values obtained by operating gamma data for each gray value based on the gamma data result value for the reference luminance value after the MTP process is performed. Alternately, according to another embodiment, the data voltage value for each color for each of the other gray values may be calculated through an equation by using a data voltage value converted based on the gamma data result value for the reference luminance value after the MTP process is performed. The equation is not limited to a particular equation and may be an equation including a proportional expression of data voltage for each color for each predetermined luminance according to the specification of the driver IC.

Figure 3:
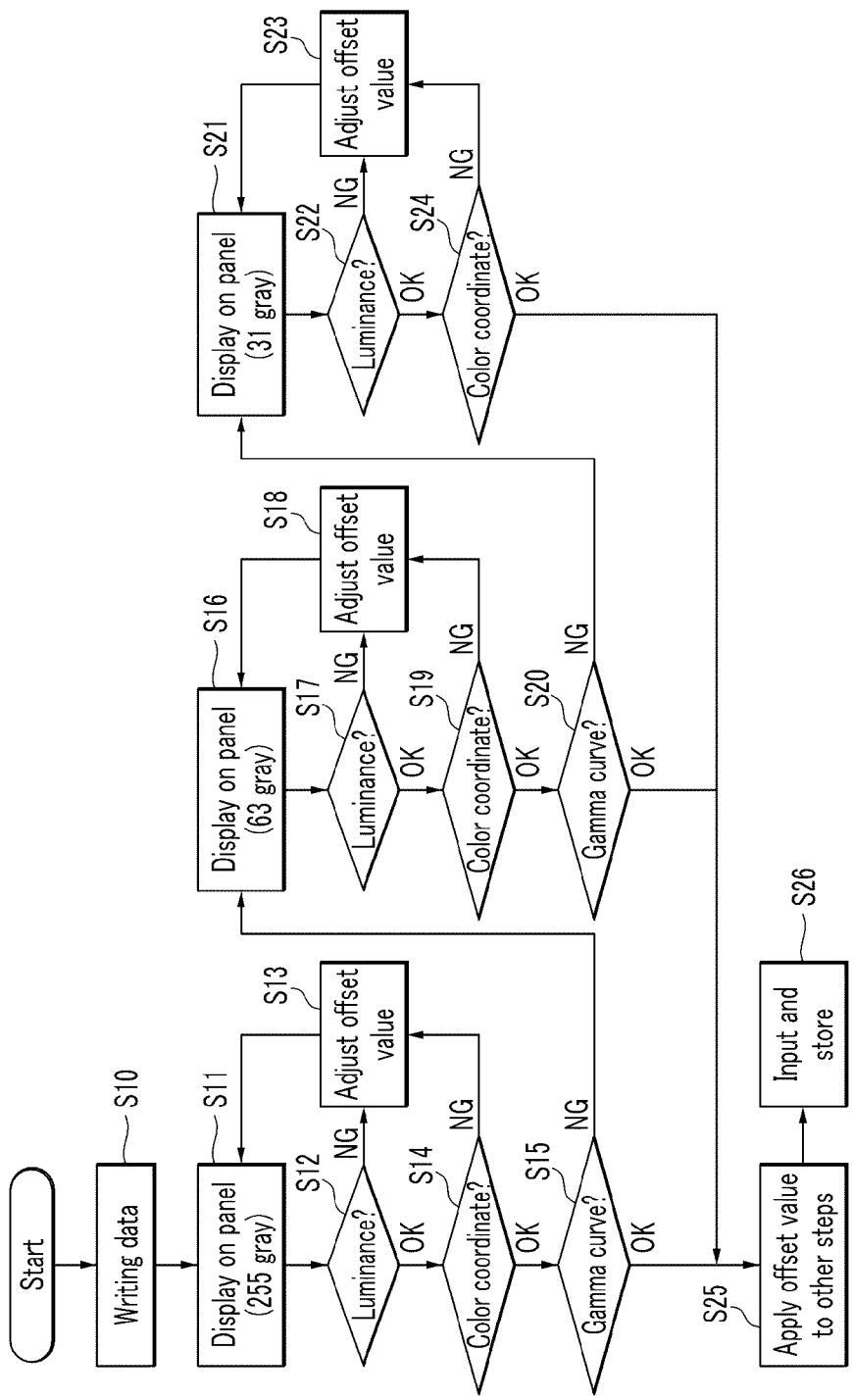
FIG. 3 is a flowchart showing a process of correcting optical characteristics such as luminance for reference luminance value in a luminance compensator 22 of FIG. 1.

FIG. 3 is a flowchart showing a process of correcting optical characteristics such as luminance for reference luminance value.

FIG. 3 illustrates a adjustment step of selecting the reference luminance value and performing optical correction for the sample gray value as shown in FIG. 2 in further detail.

First, a sample data signal for any one of sample gray values for the reference luminance value is applied (S10). For example, a data signal for 255 gray value is applied to drive the display panel and thus display an image (S11).

After optical characteristic information such as luminance and a color coordinate is acquired from the video of the display panel, it is sequentially determined whether the optical characteristic information complies with a target specification as in steps S12 and S14. An order of the determined optical characteristic information is not limited and a process of determining specifications of other information other than the optical characteristic information shown in FIG. 3 may be further included.

Specifically, first, it is determined whether luminance acquired from the displayed video of sample gray value is within the specification range of target luminance in adjustment step S12.

If the luminance is within the target luminance range, a specification range of a color coordinate is determined in adjustment step S14 and if the luminance is not within the target luminance range, an offset value is adjusted in adjustment step S13.

Similarly, when it is determined whether the luminance is within the specification range of a color coordinate in adjustment step S14, if the luminance is within the specification range, the process enters adjustment step S15, and if not, the offset value is adjusted in adjustment step S13.

In adjustment step S13, the display panel is driven by adjusting the offset value and optical characteristic information is acquired from the compensated displayed video again, and then steps S12, S14, and S13 are repeatedly performed.

If the optical characteristic information such as luminance and a color coordinate of the displayed video for the sample gray value complies with a target specification, the optical characteristic information is compared with an ideal gamma curve in adjustment step S15.

When the optical characteristic information such as luminance acquired from the video of the display panel displayed by a data signal corresponding to the sample gray value is within the target specification range of the gamma curve, a gamma data value and an offset value for the sample gray value 255 are transferred in order to calculate result values of the other luminance adjustment steps (S25). In addition, information such as the gamma data value and the offset value for the sample gray value 255 is input and stored in the storage unit (S26).

Meanwhile, when the optical characteristic information is beyond the target specification range of the gamma curve in adjustment step S15, the compensation process of the display panel for other sample gray values such as 63 gray value is repeatedly performed. That is, an image corresponding to 63 gray value is displayed on the panel in adjustment step S16, optical characteristic information is acquired, and thus steps S17 to S19 are repeated.

Thereafter, only if the optical characteristic information satisfies the standard specification range of the optical characteristic information, the gamma curve is compared with the ideal gamma curve as in adjustment step S20 and the process proceeds to steps S25 and S26, and if not, the process proceeds back to steps S21 to S24 as a compensation process of the display panel with 31 gray value.

Since in the embodiment of FIG. 3, points of a sample gray value compensated by being compared to the ideal gamma curve are compensated by being limited to two gray values, e.g., sample gray values 255 and 63 of the reference luminance value, the comparison process of the gamma curve may be omitted in steps S21 to S24 as the compensation process of the 31 gray value. However, the present invention is not limited to the described embodiment and a comparison process with an ideal gamma curve for the 31 gray value may be further included after adjustment step S24 of determining a specification range of the color coordinate for 31 gray value.

Meanwhile, in adjustment step S25, gamma data values and offset values for sample gray values 255, 63, and 31 are transferred from each correction process adjustment step. Then, result values of other luminance adjustment steps are calculated by using the information.

The offset values in steps S13, S18, and S23 are set by the following equation and may be applied when compensating data. In the following equation, only some example parameters for the sample gray value of the reference luminance value are described and values for other reference luminance value may be naturally substituted and input.

$$\text{offset value} = \text{data } DXF - \text{data } SXF \quad \text{(Equation 1)}$$

In equation 1, offset value: difference value between a gamma data value according to input reference luminance value and an actual gamma data value according to the reference luminance value (represented by adjustment step X) after optical compensation data DXF: input default value of gamma data according to reference luminance value 255 gray value data SXF: corrected value of gamma data according to the reference luminance value 255 gray value after the optical compensation Further, gamma data values in other luminance adjustment steps may be calculated by the following equation from the offset value obtained by Equation 1 and gamma data result values for a sample gray value selected from among the reference luminance value.

$$\text{data } NNX = \text{data } DNX - \text{offset value}(Q/W) \quad \text{(Equation 2)}$$

Wherein in Equation 2, data NNX: corrected value of gamma data according to X gray value of other luminance adjustment step N by calculation.

data DNX: input default value of gamma data according to X gray value of other luminance adjustment step N offset value: offset value according to reference luminance value 255 gray value calculated in Equation 1

Q/W: luminance ratio of the luminance of X gray value in the corresponding luminance adjustment step N to the reference luminance value having a 255 gray value The gamma data result values of all the other luminance adjustment steps are operated in adjustment step S25, and according to some embodiments, data voltage of all the other luminance adjustment steps may also be found by applying a value obtained by converting the gamma data value for the reference luminance value into data voltage as an absolute value.

When the gamma data result values of all the other luminance adjustment steps were operated in adjustment step S25, the gamma data result values may be converted into data voltage as absolute values by the gamma value converter of the gamma correction system according to the some embodiments.

As a result, a difference in the gamma data result value, which occurs while correcting the reference luminance value, is found and thus gamma data result values of all the luminance adjustment steps are calculated by the equation in which the difference multiplied by a luminance ratio is applied to the other luminance adjustment steps.

Figure 5:
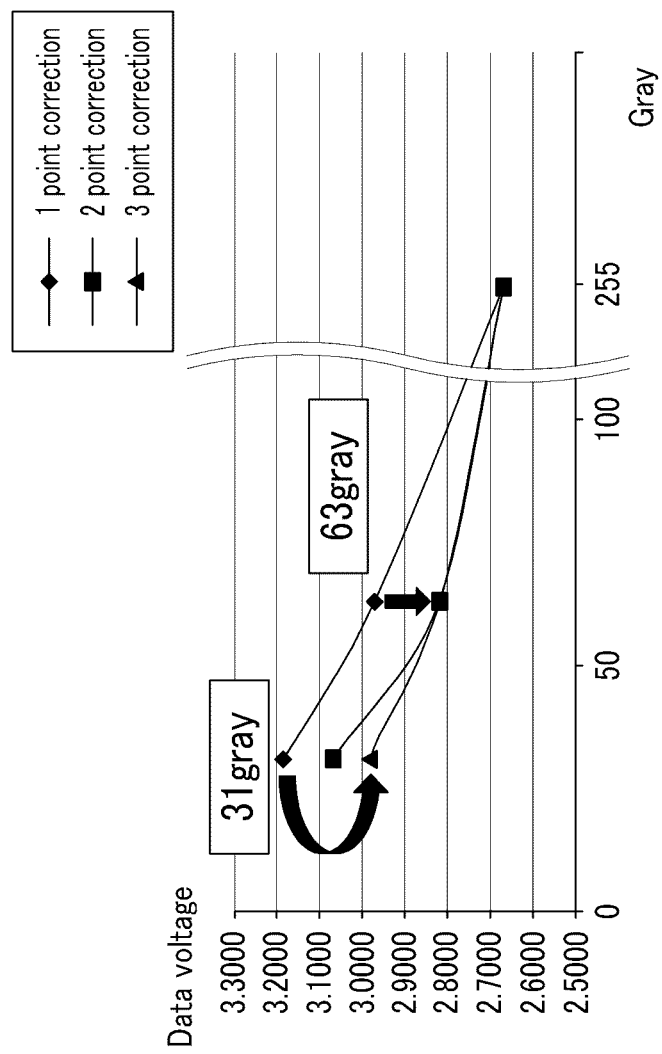
FIG. 5 is a graph showing an effect of reducing operations of a process for compensating an optical characteristic by using a gamma correction system for a display device according to some embodiments.

FIG. 5 is a graph showing an effect of reducing operations of a process for compensating an optical characteristic by using a gamma correction system for a display device according to some embodiments.

By performing the gamma correction method according to the some embodiments, the number of steps in the MTP correction process for the reference luminance value can be reduced.

The graph of FIG. 5 includes a 1 point correction graph representing data voltage values for each gray value when performing correction for one gray value level (for example, V255), a 2 point correction graph representing data voltage values for each gray value when performing correction for two gray value levels (for example, V255 and V63), and a 3 point correction graph representing data voltage values for each gray value when performing correction for three gray value levels (V255, V63, and V31).

Generally, a 3 point correction for at least three gray value levels (V255, V63, and V31) for the reference luminance value is performed because it is difficult to satisfy a gamma characteristic without correcting large dispersion in a low gray value such as V31 gray value. That is, as a plurality of sample gray value levels are employed and compensated, a desired data voltage curve for each gray value can be obtained. In the embodiment of FIG. 5, the 3 point correction graph is considered as a desired data voltage curve for each gray value.

Meanwhile, when data correction is performed by employing a plurality of sample gray values like the 3 point correction, a tact time increases, thereby leading to a decline in production of the entire line of products.

According to the some embodiments, when 2 point correction of additionally performing compensation for V63 gray level is performed, data voltage in the V63 gray level coincides with the ideal 3 point correction graph and data voltage values are calculated by using a compensated data voltage value of V 63 in the rest of the low gray values such as V31. That is, by using a data voltage value for a sample gray value level subjected to optical compensation by using an equation such as the following exemplified Equation 3, in the rest of gray levels, optical characteristic can be compensated to be close to the ideal 3 point correction graph without directly performing optical compensation in the other gray levels by substitution with the operated result values. As a result, a time to perform optical compensation in an actual production line may be reduced, which leads to an increase in production.

In Equation 3, a gray value change rate through the optical compensation in V63 as shown in FIG. 5 is used as a change rate of V31. In this case, a target value for data voltage of V31 can be obtained by adding a unique characteristic offset change rate of V31. In other words, even though the 2 point correction for two gray levels V255 and V63 is performed, a target value for data voltage of a V31 gray value as the rest of sample gray values may be derived by using a change rate in V63.

$$V_{31} = V_{init31}(R_{63} - R_{off31}) \quad \text{(Equation 3)}$$

In Equation 3, $V_{31}$: a target value for gray value 31 data voltage $V_{init31}$: an initial value gray value 31 data voltage $R_{63}$: a gray value change rate through the optical compensation for a gray value 63

$R_{off31}$: a unique characteristic offset change rate for a gray value 31

Therefore, by the gamma correction method according to some embodiments, compensation for each 2 point gray values (V255 and V63) is performed instead of a compensation process of performing correction for each 3 point gray values (V255, V63, and V31), thereby minimizing a change in optical characteristic, reducing a unit process time, and greatly contributing to improving the productivity.

Figure 6:
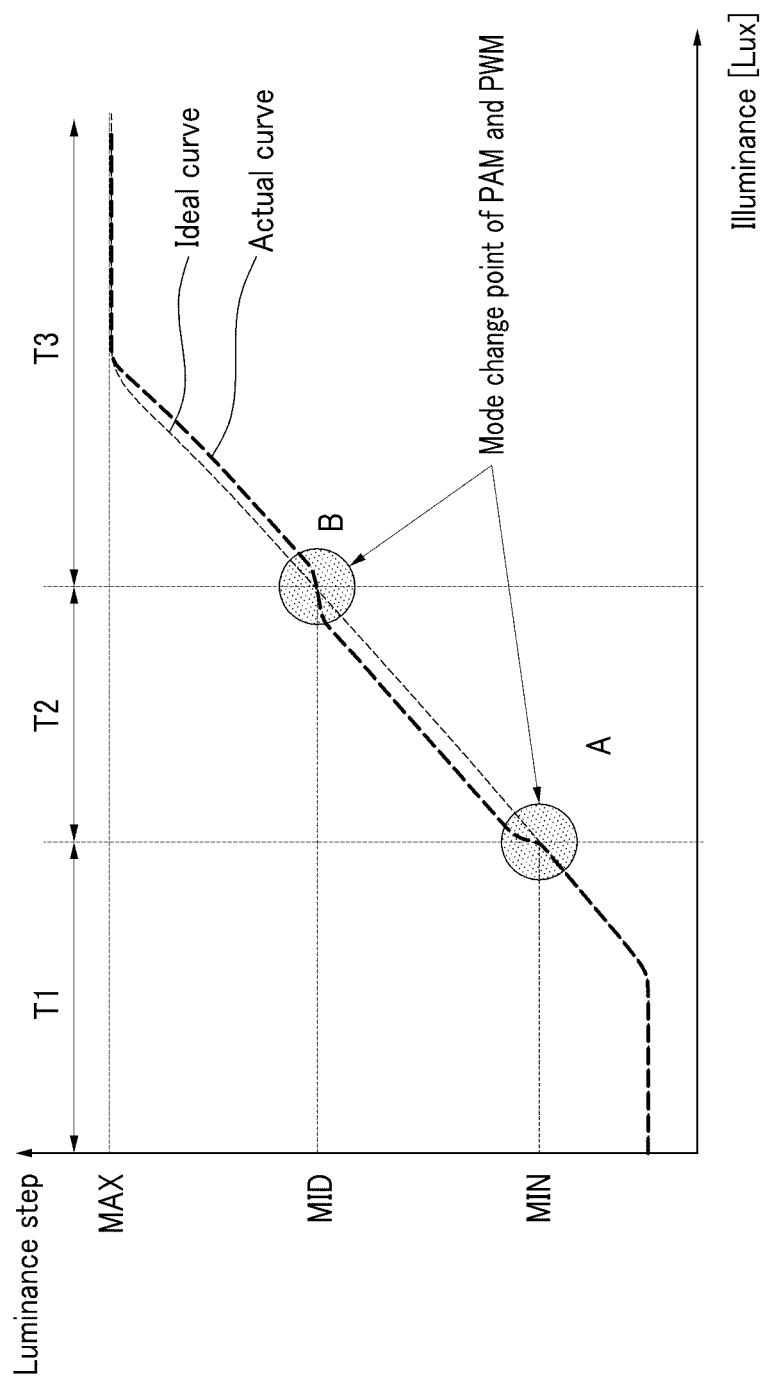
FIG. 6 is a graph showing an abnormal phenomenon of luminance in a combined type pulse driving mode of a PWM and a PAM of a display panel improved through a gamma correction system for a display device according to some embodiments.

FIG. 6 is a graph showing an abnormal phenomenon of luminance in a combined pulse driving mode of a PWM and a PAM of a display panel improved through a gamma correction system for a display device according to some embodiments.

As a pulse driving mode of an active matrix organic light emitting diode (AMOLED), a pulse width mode (PWM) may be used because improved accuracy in maintaining values of compensated optical characteristics in a reference luminance adjustment step. However, a problem for the PWM method is that it may accelerate deterioration in a material of an organic light emitting element because current density of the reference luminance value adjustment step is consistently maintained even in low luminance adjustment steps, which greatly influences an image sticking or a life-span of the display device. Therefore, in order to address this problem, a method of driving the display with the PWM mode combined with a pulse amplitude mode (PAM) may be used. In this case, as shown in A and B of FIG. 6, an abnormal point of luminance is generated at a change portion of the PWM and PAM. When the PWM is combined with PAM, it is difficult to predict a change in the PAM unlike the PWM of which an optical characteristic remains unchanged and consequently, the abnormal point of luminance is generated at the boundary portion of the modes.

Specifically, in the PWM method, which is a driving mode of changing luminance by using the PWM technique, luminance is reduced by an off duty ratio without changing a color coordinate, whereas in the PAM method, when an exact value of data voltage is not input, the luminance and the color coordinate exhibit large dispersion.

Therefore, according to the gamma correction method according to some embodiments, since the data voltage can be exactly calculated in the entire luminance spectrum, accuracy of the luminance and color coordinate can be improved, thereby acquiring more accurate optical characteristic than in the PAM. Therefore, the abnormal phenomenon can be prevented from being generated around the change points.

According to some embodiments, a luminance correction device for a display device having advantages of minimizing a variation in optical characteristics in other luminance adjustment steps except for a reference luminance adjustment step and accurately correcting dispersion or deviation of luminance in any step and a method thereof.

Further, a display device having uniform optical characteristics for each luminance value by using a device compensating dispersion or deviation of luminance so as to provide reliable quality is disclosed.

Technical objects to be achieved in the present invention are not limited to those described above, and other technical objects not described herein will be apparently understood by those skilled in the art from the disclosure of the present invention.

An embodiment of the present invention includes a gamma correction system for a display device, including: a display panel displaying video, a measuring unit configured to acquire optical characteristic information from the video displayed on the display panel, and a display panel driver configured to convert a gamma data result value obtained after performing optical compensation for at least two sample gray values among a plurality of reference luminance values into data voltage and calculating data voltage for the rest of the luminance values for which optical compensation is not performed.

The display panel driver may include a reference luminance value selector selecting the plurality of reference luminance, a luminance compensator performing optical compensation for the sample gray values to acquire gamma data result values, and a gamma value converter converting the gamma data result values to corresponding data voltage and calculating data voltage for the rest of the luminance values.

The plurality of reference luminance values may be divided into a plurality of luminance adjustment steps including a plurality of gray values among all gray values and is the maximum luminance value of each of the luminance adjustment steps.

The sample gray values may be at least two reference luminance values selected from among the plurality of reference luminance value and include the maximum reference luminance value.

The luminance compensator may perform compensation in other luminance adjustment steps by using the gamma data result value calculated by performing optical compensation for the sample gray values and an offset value acquired in the optical compensation.

The gamma value converter may calculate data voltage for the rest of luminance by using linear interpolation. The optical characteristic information may be information on luminance and a color coordinate of the displayed video, but is not limited thereto.

The optical compensation may compensate deviation from standard target values of luminance, a color coordinate, and a gamma curve corresponding to the sample gray value for the displayed video of the display panel.

Another embodiment includes a gamma correction method for a display device for correcting an optical characteristic of video data provided to a display panel displaying video, the method including: selecting a plurality of reference luminance, performing optical compensation for at least two sample gray values among the plurality of reference luminance values, acquiring a gamma data result value corresponding to the sample gray value after the optical compensation to convert the gamma data result value into data voltage, calculating data voltage for the rest of the luminance values for which the optical compensation is not performed by using the data voltage of the sample gray value, and performing gamma compensation of video data applied to the display panel by using the data voltage for the luminance.

The selecting of the reference luminance values may include dividing into a plurality of luminance adjustment steps including a plurality of gray values among all gray values and selecting the maximum luminance value of each luminance adjustment step.

The sample gray value may include the maximum reference luminance value among the plurality of reference luminance. The calculating of data voltage for the rest of the luminance values may include performing linear interpolation based on the data voltage of the sample gray value.

The optical compensation compensates deviation from standard target values of luminance, a color coordinate, and a gamma curve corresponding to the sample gray value for the displayed video on the display panel.

Yet another embodiment includes a gamma correction method for a display device for correcting an optical characteristic of video data provided to a display panel displaying a video, the method including: selecting a plurality of reference luminance values, performing optical compensation for at least two sample gray values among the plurality of reference luminance values, obtaining a gamma data compensation value for the rest of the luminance values by using the gamma data result value for the sample gray value calculated after the optical compensation and an offset value acquired from the optical compensation, acquiring the gamma data result value for the sample gray value and gamma data compensation values for the rest of the luminance values to convert the values into data voltage, and performing gamma compensation of video data applied to the display panel by using the data voltage.

According to the embodiments described above, it is possible to minimize a variation in optical characteristics in luminance adjustment steps other than a reference luminance adjustment step in the display device, and accurately correct dispersion or deviation of luminance in any step.

According to the embodiments described above, it is possible to reduce a unit process time in a process of correcting dispersion or deviation of luminance while minimizing a variation in optical characteristics, thereby contributing to improving productivity of the display device.

Further, according to the embodiments, it is possible to prevent an abnormal phenomenon of luminance from occurring around a change point of a pulse driving mode in a combined type pulse driving mode of a pulse modulation mode (PWM) and a pulse amplitude mode (PAM) of the display device to accurately maintain optical characteristics, thereby enhancing reliability of the quality of the display device.

The drawings and the detailed description described above are examples for the present invention and provided to explain the present invention and the scope of the present invention described in the claims is not limited thereto. Therefore, it is understood that various modifications and other equivalent embodiments may be possible by those who are skilled in the art. Those skilled in the art can omit some of the constituent elements described in the present specification without a reduction in performance thereof or can add constituent elements to improve performance thereof. Further, those skilled in the art can modify the sequence of the steps of the method described in the present specification depending on the process environment or equipment. Therefore, the range of the present invention must be determined by the scope of the claims and the equivalent, not by the described embodiments.

What is claimed is:

1. A gamma correction system for a display device, comprising:
    a display panel configured to display an image;
    a measuring unit configured to acquire optical characteristic information from the image displayed on the display panel; and
    a display panel driver configured to convert a gamma data result value obtained after performing optical compensation for at least two sample gray values among a plurality of reference luminance values into a corresponding data voltage and calculate a data voltage for the rest of the luminance values for which optical compensation is not performed;
    wherein the optical compensation compensates deviation from standard target values of luminance, a color coordinate, and a gamma curve corresponding to the sample gray value for the displayed image on the display panel.

2. A gamma correction system for a display device comprising:
    a display panel configured to display an image;
    a measuring unit configured to acquire optical characteristic information from the image displayed on the display panel; and
    a display panel driver configured to convert a gamma data result value obtained after performing optical compensation for at least two sample gray values among a plurality of reference luminance values into a corresponding data voltage and calculate a data voltage for the rest of the luminance values for which optical compensation is not performed;
    wherein the display panel driver includes:
        a reference luminance value selector configured to select the plurality of reference luminance values,
        a luminance compensator configured to perform optical compensation for the sample gray values to acquire gamma data result values, and
        a gamma value converter configured to convert the gamma data result values to a corresponding data voltage and calculate a data voltage for the rest of the luminance values.

3. The gamma correction system for a display device of claim 2, wherein:
    the plurality of reference luminance values are divided into a plurality of luminance adjustment steps including a plurality of gray values among all gray values which correspond to the maximum luminance values of each of the luminance adjustment steps.

4. The gamma correction system for a display device of claim 2, wherein:
    the sample gray values are at least two reference luminance values selected from among the plurality of reference luminance values and include the maximum reference luminance values.

5. The gamma correction system for a display device of claim 2, wherein:
    the luminance compensator is configured to perform compensation in other luminance adjustment steps by using the gamma data result value calculated by performing optical compensation for the sample gray values and an offset value acquired during optical compensation.

6. The gamma correction system for a display device of claim 2, wherein:
    the gamma value converter calculates data voltage for the rest of the luminance values by using linear interpolation.

7. The gamma correction system for a display device of claim 1, wherein:
    the optical characteristic information includes information on luminance and a color coordinate of the displayed video.

8. A gamma correction method for a display device for correcting an optical characteristic of image data provided to a display panel displaying an image, the method comprising:
    selecting a plurality of reference luminance values;
    performing optical compensation for at least two sample gray values among the plurality of reference luminance values;

acquiring a gamma data result value corresponding to a sample gray value after the optical compensation to convert the gamma data result value into a corresponding data voltage;

calculating a data voltage for the rest of the luminance values for which the optical compensation is not performed by using the data voltage of the sample gray value; and performing gamma compensation of video data applied to the display panel by using the data voltage for the luminance.

9. The gamma correction method for a display device of claim 8, wherein:

selecting of the reference luminance value includes dividing into a plurality of luminance adjustment steps including a plurality of gray values among all gray values and selecting the maximum luminance value of each luminance adjustment step.

10. The gamma correction method for a display device of claim 8, wherein:

the sample gray value includes the maximum reference luminance value among the plurality of reference luminance value.

11. The gamma correction method for a display device of claim 8, wherein:

calculating the data voltage for the rest of the luminance values includes performing linear interpolation based on the data voltage of the sample gray value.

12. The gamma correction method for a display device of claim 8, wherein:

the optical compensation compensates deviation from standard target values of luminance, a color coordinate, and a gamma curve corresponding to the sample gray value for the displayed image on the display panel.

13. A gamma correction method for a display device for correcting an optical characteristic of image data provided to a display panel displaying an image, the method comprising:

selecting a plurality of reference luminance values;

performing optical compensation for at least two sample gray values among the plurality of reference luminance values;

obtaining a gamma data compensation value for the rest of the luminance values by using the gamma data result value for the sample gray value calculated after the optical compensation and an offset value acquired from the optical compensation;

acquiring the gamma data result value for the sample gray value and gamma data compensation values for the rest of the luminance values and then converting the gamma data compensation values into data voltage; and performing gamma compensation of image data applied to the display panel by using the data voltage.

* * * * *